United States Patent
Fraizer et al.

(10) Patent No.: US 12,553,584 B2
(45) Date of Patent: Feb. 17, 2026

(54) CLEAR THICK OUTER LENS

(71) Applicant: Valeo Vision, Bobigny (FR)

(72) Inventors: Robert Fraizer, Auburn Hills, MI (US); Colby Darlage, Troy, MI (US); Brian Guinn, Troy, MI (US)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/679,566

(22) Filed: May 31, 2024

(65) Prior Publication Data

US 2025/0164093 A1 May 22, 2025

Related U.S. Application Data

(60) Provisional application No. 63/600,378, filed on Nov. 17, 2023.

(51) Int. Cl.
| | |
|---|---|
| *F21S 41/275* | (2018.01) |
| *F21S 41/20* | (2018.01) |
| *F21S 41/27* | (2018.01) |
| *F21S 41/40* | (2018.01) |

(52) U.S. Cl.
CPC .......... *F21S 41/2805* (2024.05); *F21S 41/27* (2018.01); *F21S 41/275* (2018.01); *F21S 41/40* (2018.01)

(58) Field of Classification Search
CPC ................................ F21S 41/27; F21S 41/275
See application file for complete search history.

(56) References Cited

U.S. PATENT DOCUMENTS

| | | | |
|---|---|---|---|
| 4,708,908 A | 11/1987 | Tateoka et al. | |
| 5,073,012 A * | 12/1991 | Lynam | G02F 1/1533 349/122 |
| 6,533,439 B1 | 3/2003 | Duflos et al. | |
| 11,454,750 B1 | 9/2022 | Blume | |
| 11,859,790 B2 | 1/2024 | Fraizer et al. | |
| 2002/0012250 A1* | 1/2002 | Nestell | F21S 45/10 362/267 |
| 2016/0161642 A1 | 6/2016 | Dellock et al. | |
| 2019/0032884 A1 | 1/2019 | Martus et al. | |
| 2019/0064407 A1 | 2/2019 | Krogman et al. | |
| 2019/0093858 A1* | 3/2019 | Wykoff, II | F21V 3/10 |

FOREIGN PATENT DOCUMENTS

JP      2021096953 A      6/2021

OTHER PUBLICATIONS

Written Opinion and International Search Report of the International Search Authority for PCT/US2024/055460, mailed Feb. 17, 2025, 12 pgs.

\* cited by examiner

*Primary Examiner* — Sean P Gramling
(74) *Attorney, Agent, or Firm* — Young Basile Hanlon & MacFarlane, P.C.

(57) ABSTRACT

An outer lens including: a first material with a first composition including: a polymer that is substantially free of ultraviolet stabilizers; and a second material with a second composition that includes: a polymer that includes the ultraviolet stabilizers, wherein the second material surrounds all or a portion of the first material and extends between an external environment of an automative vehicle and the first material.

20 Claims, 6 Drawing Sheets

Exposed thick PC

CLEAR THICK OUTER LENS

CROSS REFERENCE TO RELATED APPLICATIONS

This application claims the benefit of U.S. Provisional Application No. 63/600,378, filed Nov. 17, 2023, the contents of which are incorporated by reference herein.

FIELD

The present teachings relate to a light system including a thick lens that is clear and is free of any yellow appearance.

BACKGROUND

Vehicles include many different types of lights. Some types of lights included on a vehicle are low beam headlights, high beam headlights, taillights, turn signal lights, fog lights, running lights, or a combination thereof. Each of these lights extend out of an outer surface of a vehicle so that they provide light for the driver or provide notice to surrounding drivers. The light systems in addition to providing notice and illuminating surroundings also create an aesthetic of a vehicle.

Thus, there is a need for a light system with a lens that appears thick from an exterior of the light system and is clear. There is a need for a lens that is thick and is free of any yellow appearance. There is a need for lenses that have a thickness that is about 3 mm or more, about 7 mm or more, or about 12 mm or more and about 25 mm or less. It would be desirable to have a lens that appears thick and is protected from changing over time so that the lens maintains a clear appearance.

SUMMARY

The present teachings provide: an outer lens including: a first material with a first composition including: a polymer that is substantially free of ultraviolet stabilizers; and a second material with a second composition that includes: a polymer that includes the ultraviolet stabilizers, wherein the second material surrounds all or a portion of the first material and extends between an external environment of an automative vehicle and the first material.

The present teachings provide: an outer lens including: an interior surface that is configured to face an interior of an automotive vehicle; an exterior surface that faces away from the interior of the vehicle and faces an environment exterior to the automotive vehicle; a first material located between the interior surface and the interior surface, the first material including: a first composition including acrylic, polyurethane, polycarbonate, or a combination thereof and the first composition is substantially free of ultraviolet stabilizers; and a second material located between the first material and the exterior surface so that the second material is located between the environment and the first material, the second material including; a second composition including acrylic-urethane, polyurethane, polycarbonate, or a combination thereof and the ultraviolet stabilizers.

The present teachings provide: A method including: disposing two or more layers of a first material including: a polymer that is substantially free of ultraviolet stabilizers; and disposing one or more layers of a second material over the first material between the first material and an external environment so that the second material protects the first material from the external environment, the second material including: a polymer that includes the ultraviolet stabilizers, wherein the two or more layers of the first material and the one or more layers of the second material have a total thickness of about 10 mm or more.

The present teachings provide a light system with a lens that appears thick from an exterior of the light system and is clear. The present teachings provide a lens that is thick and is free of any yellow appearance. The present teachings provide lenses that have a thickness that is about 3 mm or more, about 7 mm or more, or about 12 mm or more and about 25 mm or less. The present teachings provide a lens that appears thick and is protected from changing over time so that the lens maintains a clear appearance.

DETAILED DESCRIPTION

Figure 1:
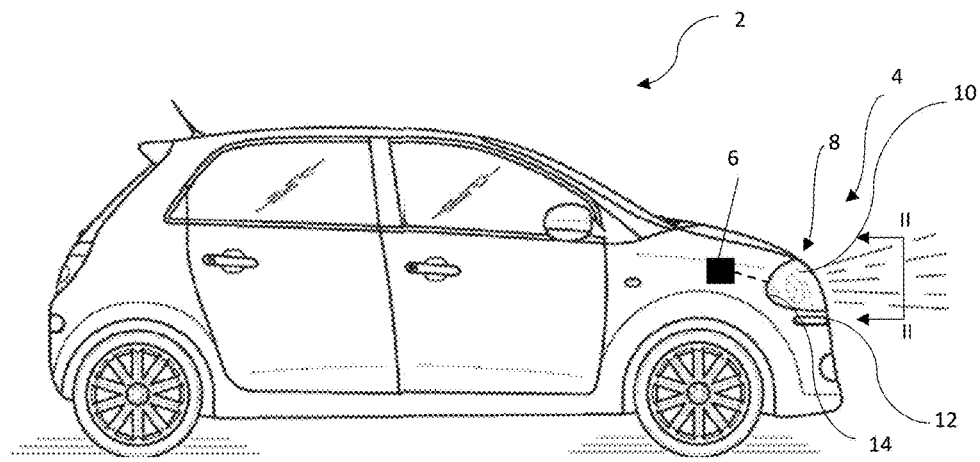
FIG. 1 is a side view of a vehicle including a light system.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located within a vehicle. Preferably, the light system is part of a vehicle such as a car, motorcycle, bus, truck, semi-truck, SUV, XUV, four-wheeler, dirt bike, tractor, combine, heavy equipment, farm equipment, industrial equipment, commercial equipment, or a combination thereof. The light system may project light in a forward direction, rear direction, side direction, vertical direction (e.g., z-axis), from a fore to an aft, an aft to a fore, or a combination thereof. The fore may be a forward direction of a vehicle or a front. The aft may be a rear direction of a vehicle or a rear. Preferably, the light system projects a light from an external surface of the vehicle to a location in front of the vehicle or at an angle relative to the front or rear of a vehicle. The light system may direct some light at the ground. The light system may direct some light above the ground. The light system may be integrated into a front end, a rear end, or both of a car. The light system may be an assembly. The light system may be a sealed light system that is integrated into a vehicle. The light system may be a sub-assembly that is included in a larger light system. The light system may be integrated into another light system and may function to be part of the light system. The light system may project light out of the vehicle. The light systems may be multiple light systems or light sources stacked one above the other, side by side, within different planes, within a same plane and projecting in different directions, integrated into a single light system, or a combination thereof. The light system may have multiple smaller light systems or light sources. The plurality of light systems or lights may be located in one light system. The plurality of light systems may operate independently of one another such that one light system may not affect another light system or portion of the light system. The light of the vehicle may be two or more, three or more, or four or more light systems located adjacent one another. The light system may be or include one or more static lights, one or more movable lights, and one or more light sources.

The light sources function to produce light. The light source may be a device or a plurality of devices that create light and the light extends outward from the light source. The light source may produce a high beam, a low beam, a blending beam, a running light, a daytime running light (DRL), a turn signal, a brake light, or a combination thereof. The light sources may have different functions. For example, one light source may provide a daytime running light and another light source may be a turn signal. Preferably, a first light source and a second light source combine together to provide a single light function. The light sources may direct light from a rear of a lens to a front of the lens. The light source may comprise a plurality of lights or may be a single light source within a set of light sources. The plurality of lights may be in one set or group of light sources. The plurality of lights may be located in rows, columns, a matrix, or a combination thereof. The light source may be a single light that projects light. In another example, a light source may direct light in a first direction and a second light source may direct light in a second direction that is different from the first direction. The first light from a first light source and the second light from a second light source may extend in different directions but may be visibly combined to provide a light function. The first direction may be along a z-axis within a coordinate system. The second direction may be along an x-axis within a coordinate system. The light source may direct light through a vertical portion of a lens (e.g., a waterfall portion).

The light sources may be any type of lighting device that produces light such as an incandescent bulb, fluorescent light, compact fluorescent lamp, halogen lamp, light emitting diode (LED), high intensity discharge lamps (HID); halogen lights, xenon lights, a laser diode, phosphorous bulb, or a combination thereof. The light sources may be a single lamp or bulb. Preferably, the light sources are part of a set of light sources that includes a plurality of lamps, bulbs, diodes, or a combination thereof. The light sources may be part of a set of light sources that includes 2 or more, 3 or more, 4 or more, 5 more, 7 or more, 9 or more, or 11 or more light sources that produce light and combine together to form the light extending from the light system. The sets of light sources may include 20 or less, 18 or less, 16 or less, or 14 or less devices that produce light (e.g., each set may include 8 light sources or alternatively all of the sets when combined together may include 8 light sources or 2 light sources). For example, the set of light sources may be the contents of a single printed circuit board that perform a same lighting function and the set of light sources may be 8 light sources that are all located on the single printed circuit board. The set of light sources may be two or more groups of lights that are located on different printed circuit boards. The printed circuit boards may be located adjacent to one another or spaced apart from one another. The number of light sources in a part of the light may dependent upon a size of the region or a size illuminated. For example, a daytime running light may have eight or more light sources and a turn signal may have five or more light sources. In another, example, the daytime running light may include two or more groups of light sources that are spaced apart from one another such that when the two or more groups of light sources are on they combine to provide the first light function.

The light source may be one or more lights, two or more lights, or three or more lights. The light source may be static. The light sources may be free of movement. The light source may be fixed. The light sources may be a row of lights, a column of lights, a matrix of lights extending in rows and columns, or a combination thereof. For example, a matrix may have lights that are set out to be 2×2 or more, 3×3 or more, 4×4 or more, 5×5 or more, 6×6 or more, 7×7 or more, 8×8 or more, 9×9 or more, 10×10 or more. The matrix may be 100×100 or less, 75×75 or less, 50×50 or less, 25×25 or less, or even 15×15 or less. The matrix of lights may direct light through a lens (e.g., a body portion). The light sources may be a row of light sources that direct light into the lens (e.g., a body portion). The matrix may be made up of a single printed circuit board. The light sources may be located in a line or a row. The light sources may be static and may be manually or physically adjusted so that the light sources are directed to a desired location. The light sources may be fixed and the light from the light source may be moved, bent, directed, or a combination thereof by optical elements, textured portions, micro-optics, reflectors (e.g., a light guide), light blades, or a combination thereof. Each individual light of the light source may be turned on and off. The light sources may provide light towards a reflector and then the reflector may redirect (i.e., reflect) the light in a second direction. Some light sources may direct light into light pipes and some light sources may direct light towards a reflector.

The light sources (or set of light sources) of the light system may produce one light function and a second light source (or set of light sources) may produce a second light function. One light system (e.g., a bi-directional light system) may include a plurality of light sources (e.g., two or more) that produce one light function. The light system may perform only a single light function. The light system, via the light sources, may perform or provide one or more light functions, two or more light functions, or even three or more light functions. The light system may provide one or more light patterns, two or more light patterns, or three or more light patterns with a single light system. The light sources may illuminate one or more display mechanisms. The light sources may be part of a display mechanism. The light sources when illuminated may permit the display mechanism to be visible through the lens. The light sources may directly or indirectly illuminate all or a portion of a display mechanism. The light sources may be incorporated into the display mechanism or be part of the display mechanism. The light sources may be directed towards reflectors that redirect the light produced so that a light function with a light pattern (e.g., a headlight or DRL) is generated and/or visible exterior to the vehicle.

The reflectors may all be located within a housing and function to redirect the light in a predetermined pattern. The reflectors may direct light through a lens, a display mechanism, or both. The reflectors may provide indirect light (e.g., light that is directed in a first direction by a light source and then changed to a second direction by the reflector). The reflectors may combine light to form a predetermined pattern. The reflectors may each provide light to a predetermined region to form part of a pattern, part of a function, or both. One reflector may be located adjacent to one light source. The reflectors may be a plurality of reflectors. The light system may include two or more, three or more, four or more, six or more, eight or more, ten or more, twelve or more, or even fourteen or more reflectors. The light system may include 50 or less, 40 or less, 30 or less, 20 or less, or 15 or less reflectors. The reflectors may be a single reflector. The reflectors may direct light through a thick lens. The reflectors may direct light through a portion of the lens. The light system may be free of any reflectors or light directed by any reflectors The thick lens may include a body portion and a waterfall portion. The body portion and the waterfall portion may be one monolithic piece. The reflectors may have a portion that extends parallel to a body portion of a lens and a portion that extends around a waterfall portion of a lens. The reflectors may direct light through the waterfall portion of a lens. The reflectors may include a planar portion and a curved portion to direct light through a lens.

The planar portion functions to connect the reflector within the light system. The planar portion extends parallel to the body portion of the lens (e.g., a daytime running light lens (DRL lens)). The planar portion may support the printed circuit board. The planar portion may extend from a rear of the light system towards a front of the light system. The planar portion may support a printed circuit board. The planar portion may support the printed circuit board relative to the curved portion. The planar portion may support the curved portion or vice versa.

The curved portion functions to direct light from an interior of the vehicle system to an exterior of the vehicle system. The curved portion may redirect light from a light source through the lens (DLR) lens, the waterfall portion, the display mechanism, or a combination thereof. The curved portion may extend from the planar portion. The curved portion may extend downward away the planar portion or the body portion of the lens. The curved portion may extend towards the waterfall portion. The curved portion may be free of contact with the waterfall portion. The curved portion may direct light to the waterfall portion. The curved portion may direct light so that the entire waterfall portion is illuminated. The curved portion may assist in obscuring all or a portion of the light source, the printed circuit board, or both from view outside of the light system. For example, the length and the width of the waterfall portion of the lens may be illuminated so that when viewed from an exterior the entire waterfall portion of the lens may be lightened. Light may be directed from a light source into contact with the reflector and then the light may be directed from the reflector directly through the waterfall portion of the of the lens to provide a parking indicator (PI), a turn indicator (TI), daytime running light (DRL), a display, a message, a symbol, or a combination thereof. The curved portion may be located adjacent to a lens (e.g., the daytime running light lens (DRL lens)).

The lens (e.g., DRL lens) functions to provide light outside of a vehicle, notice to oncoming vehicles, illuminate a region around a vehicle, or a combination thereof. The lens may provide notice during the day. The lens may be clear. The lens may have a color that may be between yellow and blue on the light spectrum. The lens may appear neither blue nor yellow. The lens may be free of any yellow appearance, blue appearance, or both. The lens may be made of or include a polycarbonate, acrylic, a polyurethane, acrylic urethane, plastic, a polymer, or a combination thereof. The lens may be made of or include one or more materials, two or more materials, three or more materials, or even four or more materials. The materials of the lens may be substantially free of ultraviolet stabilizers (e.g., about 0.1 percent or less by total weight of the lens), be substantially free of thermal stabilizers (e.g., about 0.1 percent or less by total weight of the lens), be free of ultraviolet stabilizers, be free of thermal stabilizers, or a combination thereof. Some of the materials may include ultraviolet stabilizers, thermal stabilizers, or both. Some of the materials may be free of ultraviolet stabilizers, thermal stabilizers, or both. The lens may have one or more visible portions. The entire lens may be visible. The lens may include a waterfall portion and a body portion. The lens may have a length and a width forming a visible area (or visible region).

The length, the width, or both of the body portion, the waterfall portion, or both may be about 3 mm or more, about 5 mm or more, about 7 mm or more, about 1 cm or more, about 3 cm or more, about 5 cm or more, about 7 cm or more, or about 10 cm or more. The length, the width, or both may be about 50 cm or less, about 40 cm or less, about 30 cm or less, or about 20 cm or less. The length may be greater than the height such that the waterfall portion appears as a rectangle. The length and width (e.g., area) of the lens may have a total thickness (e.g., the total thickness may be a combination of layers of material).

A total thickness of the lens may be about 1 mm or more, about 2 mm or more, about 3 mm or more, about 5 mm or more, about 7 mm or more, or about 10 mm or more. The total thickness of the lens may be about 25 mm or less, about 21 mm or less, about 18 mm or less, about 15 mm or less, or about 12 mm or less. The total thickness of the lens may be made of one or more materials, two or more materials, three or more materials, or four or more materials. The total thickness may have one or more materials that may include one or more layers, two or more layers, three or more layers, or even four or more layers. The total thickness may have two or more materials each with one or more layers, two or more layers, or three or more layers. Some materials of the lens may include a single layer. Some of the materials may include two or more layers or three or more layers. The layers of each material may vary in thickness. The layers may extend parallel to the interior surface and the exterior surface. The layers may extend perpendicular to the interior and the exterior. The materials, the layers, or both may vary in thickness. The total thickness may be a combination of two or more materials or three or more materials. The total thickness may be a distance from an interior of a lens to an exterior of the lens. For example, the interior of the lens may align with a light system and the exterior of the lens may face the sun or an exterior. The total thickness may be a first material partially or completely covered by a second material, and a third material partially or fully covering the second material, the first material, or both.

The first material may be a first material deposited to form the lens. The first material may form an inner most portion of the lens. The first material may be made of a pure material. The first material may be free of any protectants, stabilizers, release agents, contaminants, chemical protectant materials, additives, or a combination thereof. The first material may be made of or include only the first material. The first material may be or include acrylic, polycarbonate, urethane, plastic, a polymer, or a combination thereof. The first material may have a blue appearance on the wavelength spectrum when light passes through the first material. The light when passing through the first material may have a wavelength of between about 450 nm and about 495 nm. The first material may have a first thickness.

The first material may have a thickness of about 2 mm or more, about 4 mm or more, about 6 mm or more, or about 8 mm or more. The first material may have a thickness of about 16 mm or less, about 14 mm or less, about 12 mm or less, or about 10 mm or less. The first material may form a majority of the total thickness (e.g., over half of the total thickness). The second material may cover the first material on a first side, a second side, a third side, a fourth side, or a combination thereof.

The second material functions to protect the first material, encapsulate the first material, extend around or along one or more sides of the first material or a combination thereof. The second material may protect the first material from sunlight, ultraviolet light, heat, or a combination thereof. The second material may include mold release agents, thermal stabilizers, ultraviolet stabilizers, chemical stabilizers, additives, protectants, or a combination thereof. The second material may be made of or include a plastic, a polymer, polycarbonate, urethane, acrylic, and one or more stabilizers, one or more additives, or both. The color of the second shot may be free of control. The color of the second shot may be any color that results from the combination of components, materials, additives, stabilizers, or a combination thereof. The second materials may exhibit a yellow color. Light when passed through the second material may have a wavelength between about 570 nm and about 590 nm. The second material may have a thickness that is less than a thickness of the first material.

The second material may be sufficiently thick to protect the first material from external conditions (e.g., ultraviolet light, mold release agents, chemicals, fluids, dirt, debris). The second material may protect the first material from the sun, ultraviolet light from the sun, or both. The second material may protect the first material from light of the system. The second material may be located on a first side and a second side of the first material so that a thickness of the first material and the second material is the thickness of the first material, a thickness of the second material on a first side, and a thickness of the second material on a second side. The second material may encapsulate the first material. The second material may protect the first material. The second material may be located within or covered by the third material along one or more sides, two or more sides, three or more sides, or four or more sides. The second material may have a thickness.

The second material may have a thickness of about 2 mm or more, about 4 mm or more, about 6 mm or more, or about 8 mm or more. The second material may have a thickness of about 14 mm or less, about 12 mm or less, about 10 mm or less, or about 8 mm or less. The first material may form a majority of the total thickness (e.g., half of the total thickness or less). The second material may cover the first material on a first side, a second side, a third side, a fourth side, or a combination thereof. The second material may be covered on one or more sides by a color material.

The color material may function to obscure a portion of the lens, components within the lens, components behind the lens, to separate zones or regions of a light, or a combination thereof. The color material may be a lens shut off (e.g., a location where one region ends and another region begins). The color material may prevent light from passing through one or more zones or regions of the lens. The color material may form a portion of the total thickness of the lens. The color material may extend along the length, the width, or both. The color material may not form any portion of the thickness. The color material may extend along the thickness (e.g., from the interior side to the exterior side). The color material may have a cross-sectional length (e.g., thickness) that is substantially equal to the total thickness. For example, the color material may extend substantially between the interior side and the exterior side. The color material may not form a portion of the total thickness. The color may form a portion of the total thickness in some or all regions or areas. The color material may form a portion of the total thickness to limit regions where light extends through the lens. The color material may have a cross-sectional distance (e.g., length, width, thickness) of about 0.1 mm or more, about 0.3 mm or more, about 0.5 mm or more, about 0.7 mm or more, or about 1 mm or more. The color material may have a cross-sectional distance of about 1 cm or less, about 7 mm or less, about 5 mm or less, or about 3 mm or less. The color material may be located on edges, in the center, to form one or more separate regions, to separate light types, or a combination thereof.

The color material may assist to generate a second function. For example, the clear regions may be a low beam, a high beam, a daytime running light, or a combination thereof, and the color material may separate the low beam from a high beam, the low beam from a daytime running light, a high beam from a daytime running light, or a combination thereof. The color material may generate a turn indicator, a turn signal, a brake light, a parking light, or a combination thereof. The color material may be black, orange, yellow, red, opaque, or a combination thereof. The color material may space a first function from a second function. The color material may be located only within the first material, between layers of the first material, only within the second material, between the first material and the second material, between the second material and the third material, or a combination thereof.

The third material functions to provide a hard coating over the first material, the second material, the color material, or a combination thereof. The third material may protect the lens from an exterior environment. The exterior environment may include road debris, fluids (e.g., rain, snow, sleet, hail), bugs, sunlight, rocks, stones, or a combination thereof. The third material may be a coating that is deposited in a same manner as the first material, the second material, the color material, or a combination thereof. The third material may be deposited by spraying, dipping, painting, injecting, brushing, flow coating, electrocoating, vapor deposition, electrostatic, powder coating, spin coating, direct coating, transfer coating, or a combination thereof. The third material may be a film. The third material may be applied as a liquid. The third material may be applied into a mold. The third material be applied so that the third material is applied as a thinnest layer. The third material may be deposited on a first side and a second side of the first material, the second material, or both. The third material may have a thickness on a first side and a thickness on a second side that may form a portion of the total thickness. The third material may encapsulate the first material, the second material, the color material, or a combination thereof.

The lens may have a total thickness that extends from an interior side to an exterior side. The total thickness may include a thickness of a first deposition of material, a first thickness of a second deposition of a second material, a second thickness of the second deposition of the second material, a first thickness of a third deposition of a third material, a second thickness of the third deposition of the third material, a color material, or a combination thereof. The first deposition of material may be about 30 percent or more, about 40 percent or more, about 50 percent or more, about 60 percent or more, or about 70 percent or more of the total amount, the total thickness, or both of the lens (e.g., the first deposition may be about 55% of the total thickness of the lens). The first deposition of material may be about 95 percent or less, about 90 percent or less, about 80 percent or less, about 75 percent or less, or about 65 percent or less of the total amount, the total thickness, or both of the lens. The first deposition of material may be a largest amount of material (e.g., thickness) and the second deposition of material may be a second largest amount of material within the total thickness of the lens.

The second deposition of material may be about 15 percent or more, about 20 percent or more, about 25 percent or more, about 30 percent or more, or about 35 percent or more of the total amount, the total thickness, or both of the lens (e.g., the first deposition may be about 45% of the total thickness of the lens). The second deposition of material may be about 55 percent or less, about 50 percent or less, about 45 percent or less, about 40 percent or less, or about 35 percent or less of the total amount, the total thickness, or both of the lens.

The third deposition of material may be intermittently disbursed within the thickness of the lens. The third deposition of material may be continuously located within the lens from an interior side to an exterior side of the lens. The third deposition of material may extend parallel to a direction light extends through the lens. The third deposition of material may extend perpendicular to a direction light extends through the lens. The third deposition of material may extend around a perimeter of the lens. The third deposition of material may be about 15 percent or less, about 20 percent or less, about 15 percent or less, about 10 percent or less, or about 5 percent or less of a total amount, the total thickness, or both. The third deposition of material may be about 1 percent or more, about 3 percent or more, about 5 percent or more, or about 10 percent or more of a total amount, the total thickness, or both. The third deposition of material may include, encase, surround, or a combination thereof the first material, the second material, the color material, or a combination thereof.

The color material may be intermittently disbursed within the thickness of the lens. The color material may be located on a first edge, a second edge, a middle region, or a combination thereof so that multiple light types may extend through the lens. The color material may be continuously located within the lens from an interior side to an exterior side of the lens. The color material may extend parallel to a direction light extends through the lens. The color material may extend perpendicular to a direction light extends through the lens. The color material may extend around a perimeter of the lens. The color material may be about 15 percent or less, about 20 percent or less, about 15 percent or less, about 10 percent or less, or about 5 percent or less of a total amount, the total thickness, or both. The color material may be about 1 percent or more, about 3 percent or more, about 5 percent or more, or about 10 percent or more of a total amount, the total thickness, or both. The total thickness may be the thickness from an interior (e.g., interior side) to an exterior (e.g., exterior side) of the lens.

The interior side may receive light and the exterior may project light, glow, illuminate, or a combination thereof. The interior side may be located adjacent to the lights within the light system. The exterior side may be free of any textures, angled features, optics, features that direct light out of the lens, or a combination thereof. The exterior may assist to retain light within all or a portion of the lens such that all or a portion of the lens appears to have a homogeneous amount of light along a length, width, height, or a combination thereof. The exterior may protect the lens, the light system, or both. A thickness of the lens extends between the interior side and the exterior side.

The thickness functions to direct light outward and/or spread light. Light may be directly projected through the thickness of the lens (e.g., waterfall portion, the body portion, or both). The light may directly extend from the interior side to the exterior side. The thickness of the lens may be sufficiently thick such that if a single composition of material is used to create the lens, the lens may appear to be yellow or have a yellow hue. The light may not be spread by the thickness. For example, the light may cause the lens to glow. The light may not be redirected within the thickness by total internal reflection. For example, the light extending through the thickness may entirely illuminate an area of the waterfall portion (e.g., a length L2 and a width) without the light being internally reflected. The light may extend orthogonal through the lens. The thickness may be less than the length, less than the width, or both. The thickness of the lens may be formed of a single material. For example, if the lens is formed by injection molding then the lens may be formed in a single deposition (e.g., shot) of material. The thickness may be formed of two or more layers (or depositions/shots), three or more layers, four or more layers, five or more layers, or even six or more layers of material. The thickness of the lens may be formed in one or more applications, two or more applications, or three or more applications (e.g., shots or deposits). The thickness of the lens may be formed out of a same material in different deposits such that the lens material is homogenous. A same material may be applied at different formation conditions. For example, a first deposition may be applied at a first pressure and a second deposition may be applied at a second pressure. The deposition conditions may vary in temperature, time of deposition, volume, pressure, material, mold temperature, velocity of material, density, or a combination thereof. The deposition conditions may cause the materials of the deposition to have different characteristics even through the materials are identical before deposition. The lens may be formed of two or more different materials, three or more different materials, or four or more different materials. Each material may have a different material composition.

The composition of the first material may function to resist color reversion, yellowing, color changing, or a combination thereof. The composition of the first material may be substantially pure. The composition of the first material may be free of any stabilizers, additives, agents, or other components that protect the composition of the first material from ultraviolet light, temperature, agents, chemicals, external environment, or other conditions the first material may be subjected to during operation. The composition of the second material may be different than the composition of the first material. The composition of the second material may be a less expensive material, a more stable material, a more rigid material, a material with stabilizers, agents, additives, toughness, protectants, UV protectants, thermal stabilizers, or a combination thereof.

The composition of the second material may be sufficiently thick to protect the first material. The second material may be sufficiently thick so that substantially all or all of the ultraviolet rays of the sun are prevented from contacting the first material. The second material may include one or more additives that protect the first material and the second material from the external environment. The second material may extend around or along one or more sides (e.g., or surfaces), two or more sides, three or more sides, four or more sides, five or more sides, or size or more sides of the first material. The second material may fully encapsulate the first material therein. The composition of the second material may be a polymer, plastic, a polycarbonate, an acrylic, an acrylic-urethane, a polyurethane, or a combination thereof. The second material may include one or more of the additives or stabilizers discussed herein. The second material may include one or more protectants, stabilizers, release agents, chemical protectant materials, additives, ultraviolet stabilizers, chemical stabilizers, thermal stabilizers, toughness, or a combination thereof. A third material with a composition may extend over all or a portion of the second material, the first material, or both.

The composition of the third material may be sufficiently hard so that the lens is prevented from cracking, splitting, denting, chipping, being damaged, or a combination thereof. The composition of the third material may prevent the second material, the first material, or both from being damages such that light extending through the lens is altered. The third material composition may be a UVC hard coating, a polycarbonate, an acrylic-urethane, a polyurethane, or a combination thereof. The third material may include one or more or all of the additives as the second material.

The lens may be formed by depositing the first material into a mold. The first material may be deposited in one or more layers, two or more layers, or even three or more layers. The first material may be disposed sequentially into a mold to form one substantially continuous first material that is formed by two or more sequential additions of material (e.g., shots). The first deposition of material may include two or more layers or even three or more layers of the first material. The first material may be disposed until enough material is added that the first deposition is sufficiently thick, wide, high, or a combination thereof. Once a sufficient amount of the first material is added to the mold, a second material may be added to the mold, the first material may be moved into a second mold, all or a portion of a first mold may be moved to accommodate a second material, or a combination thereof.

The second material may be disposed over all or a portion of the first material. The second material may be disposed over one or more sides or surfaces of the first material. The second material may be disposed over at least an exterior side of the first material (e.g., a side of the first material that faces an exterior environment). The second material may be disposed over the first material so that ultraviolet light is prevented from contacting the first material. The second material may fully encapsulate the first material within the second material. The second material may be disposed as one or layers, two or more layers, or three or more layers of the second material. The second material may extend over a color material.

The color material functions to prevent light from extending through the lens in some regions, prevent more than one type of light from extending through an area of the lens, prevent light from scattering outside of one or more sides of the lens, block view of one or more components of the light system from being visible through an exterior of the lens, or a combination thereof. The color material may have a color (e.g., red, yellow, orange). The color material may be black, semi-opaque, opaque, or a combination thereof. The color material may be disposed between layers of the first material, between the first material and the second material, or both. The color material may extend vertically within the lens, horizontally within the lens, along one or more sides, or a combination thereof. The color material may be located inside of the second material, a third material, or both.

The third material functions to form an outermost layer on one or more sides of the lens. The third material may be a final layer. The third material may include one or more additives that protect the first material, the second material, or both. The third material may be harder than the first material, the second material or both. The third material may allow light to pass through the lens. The third material may be a protective material. The lens may include one or more optics that assist in directing light through the first material, second material, third material, or a combination thereof.

The optics function to prevent hot spots, provide a homogenous light pattern, a homogenous distribution, amount of light, intensity of light, direct light into a lens, or a combination thereof. The optics may spread the light, prevent overlaps of light from light sources, direct light out of the lens (e.g., a thick portion of the lens such as a waterfall portion), direct light into the lens, spread light within the lens, or a combination thereof. The optics may provide a homogenous lighting appearance of a lens. The optics may be a texture added to one or more surfaces of a lens. For example, a texture may be sprayed on the lens, etched into the lens, mechanically added, mechanically formed, added during molding, added during manufacturing, or a combination thereof. The lens may be free of optics in the first material, the second material, the third material, or a combination thereof. The optics may be on an external surface, an internal surface, a location between the internal surface and the external surface, within or on the first material, within or on the second material, within or on the third material, or a combination thereof. The optics may guide light out of the lens as the light travels through the lens. The optics may guide light into the lens. The optics may change a direction of the light. The optics may permit light to exit a surface of the lens or enter a surface of the lens. Some lenses may include a texture portion on or in an external surface and/or an internal surface. The optics may have a shape that is a pyramid, half circle, square, rectangle, zig zag patterns, lines, cylindrical, tetrahedron, cube, hexagonal, icosahedron, a prism, a pentagonal pyramid, a cone, cuboid, a symmetrical shape, an asymmetrical shape, a geometric shape, a non-geometric shape, or a combination thereof. The optics may only be located on an interior of the lens so that when light passes through the lens the light is internally reflected within the lens.

The interior and the exterior of the lens (e.g., body portion and waterfall portion) may extend parallel to one another. The interior and the exterior are located a distance apart (e.g., thickness). The distance (e.g., thickness) may be sufficiently large so that light may be internally reflected to provide a uniform amount of light throughout the waterfall portion. The distance may be 6 mm or more, 8 mm or more, 10 mm or more, or 12 mm or more. The distance may be 25 mm or less, 20 mm or less, 18 mm or less, 16 mm or less, or 15 mm or less. The thickness may be equally distributed between a first deposition, a second deposition, and a third deposition. The first deposition may be a thickest layer of material. The second deposition may be a second thickest layer of material. The third deposition of material may be substantially a thinnest layer of material.

The interior may face the light source, receive light from the light source, include the display mechanism, or a combination thereof. The interior may be the only portion of the lens that include optics. The interior may direct light into the lens or through the lens. The exterior may be illuminated by light passing into and/or through the lens. The exterior may form an outer most portion of the lens. The exterior may extend coplanar to other portions of the light system, other lights, lenses of the headlights, or a combination thereof. The exterior may illuminate, allow light to pass through, or both. The light system may include a controller that controls the light sources to provide light into the interior so that the exterior of the lens is illuminated.

The controller may control how the lights are illuminated, a light pattern, when the lights are illuminated, or a combination thereof. The controller may turn on the lights when the vehicle is turned on. The controller may be in communication with one or more sets of lights to provide one or more light functions. The controller may change how the lights function, what function is provided, or both. For example, the controller may change illumination patterns to change a function displayed, change a message displayed, change a color displayed, change when a light function is displayed, change a size, change as shape, or a combination thereof. The controller may be in communication with the lights, lights in communication with the lens, or both.

FIG. 1 illustrates a side view of a vehicle 2 including a light system 4. The light system 4 is in communication with a controller 6. The light system 4 includes a headlight 8 that is covered by an outer lens 10. The light system 4 also includes a daytime running light 12 and a turn signal 14.

Figure 2:
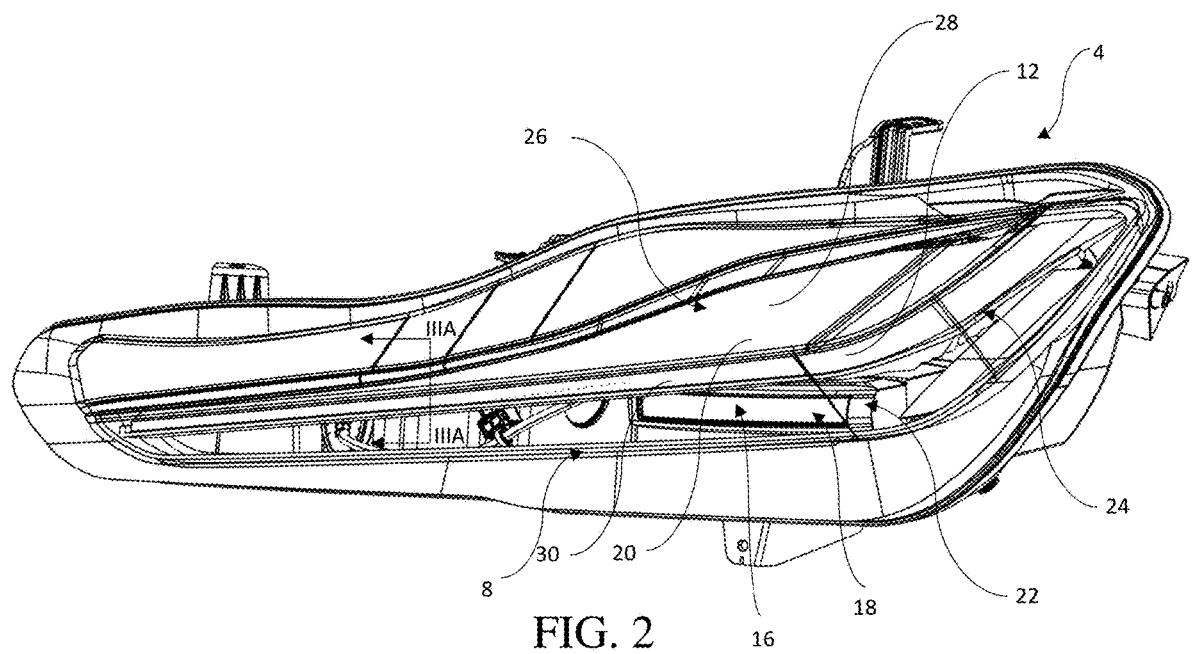
FIG. 2 illustrates a font view of the light system of FIG. 1 along line II-II.

FIG. 2 illustrates a front plan view of the light system 4 of FIG. 1 along line II-II. The light system 4 includes headlights 8 and a daytime running light 12. The headlights 8 have a high beam 16 and a low beam 18. The high beam 16 and the low beam 18 each include light sources 20 and reflectors 22. The daytime running light (DRL) 12 includes a daytime running light lens 24 (DRL lens). The light sources 20 are located behind a lens 26. The lens 26 includes a body portion 28 and a waterfall portion 30.

Figure 3A:
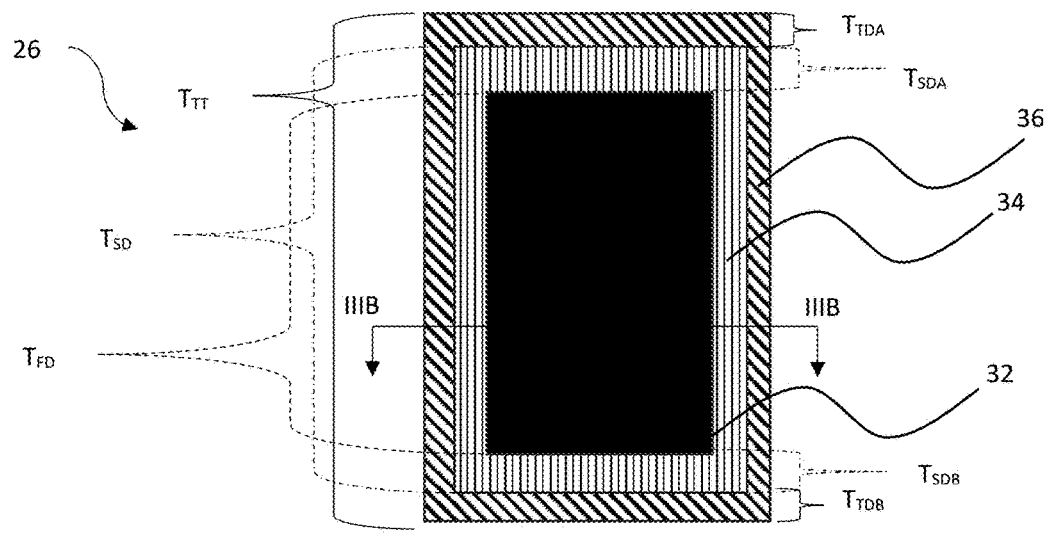
FIG. 3A is a cross-sectional view of a lens of FIG. 2 along line IIIA-IIIA.

FIG. 3A illustrates a partial cross-sectional view a portion of the lens 26 along line IIIA-IIIA of FIG. 2. The lens 26 includes a first deposition 32 of a first material, a second deposition 34 of a second material, and a third deposition 36 of a third material. The lens 26 has a total thickness ($T_{TT}$). The first deposition 32 of material has a first thickness ($T_{FD}$) that is a greatest thickness within the total thickness ($T_{TT}$). The second deposition 34 extends around the first deposition 32 and increases the first thickness ($T_{FD}$) of the first deposition 32 to a second thickness ($T_{SD}$). As shown the third deposition 36 extends around the first deposition 32 and the second deposition 34 to increase the second thickness ($T_{SD}$) to the total thickness (TT). The first deposition 32 has a first thickness ($T_{FD}$), the second deposition 34 has a top second thickness ($T_{SDA}$) and a bottom second thickness ($T_{SDB}$) on opposing sides of the first deposition 32. The third deposition 36 extends around the second deposition 34 and includes a top third thickness ($T_{TDA}$) and a bottom third thickness ($T_{TDB}$).

Figure 3B:
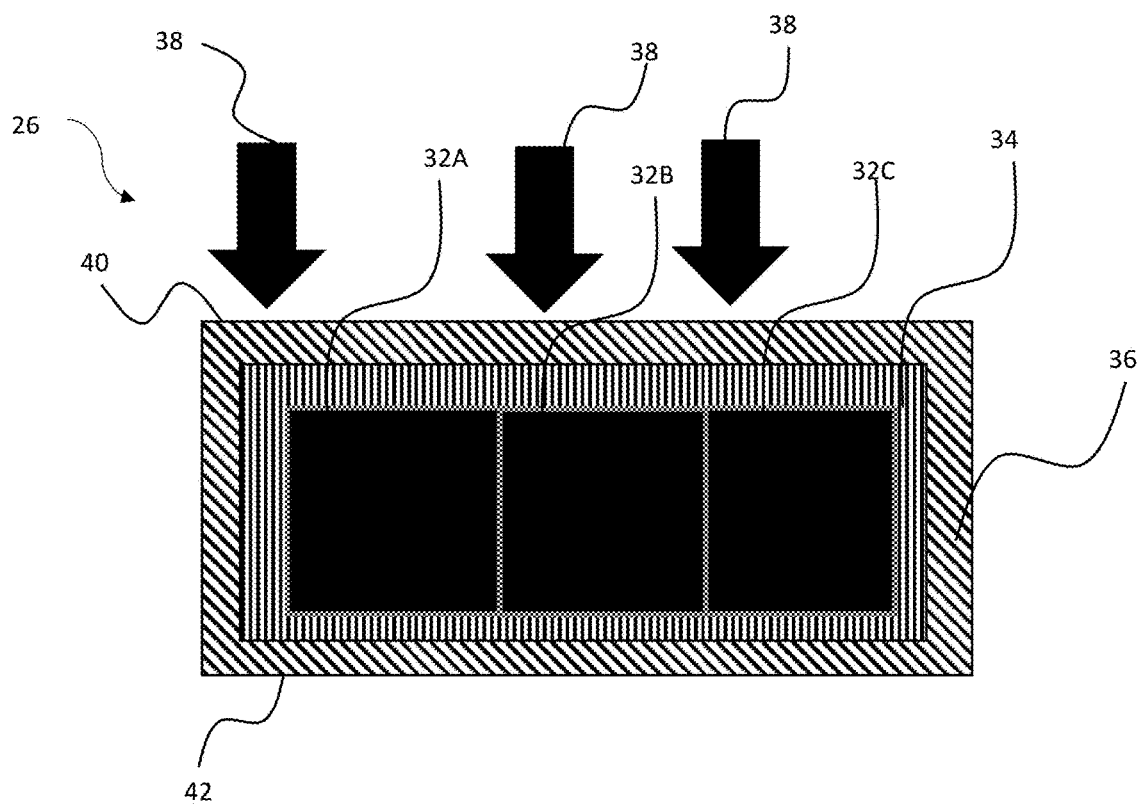
FIG. 3B is a cross-sectional view of the lens of FIG. 3A along line IIIB-IIIB.

FIG. 3B illustrates a partial cross-sectional view of the lens 26 along line IIIB-IIIB of FIG. 3B. The lens 26 has a first deposition 32 that is divided into a first layer 32A, a second layer 32B, and a third layer 32C. The layers 32A, 32B, and 32C are formed side by side. The second deposition 34 extends around all three layers 32A, 32B, and 32C of the first deposition 32. A third deposition 36 extends around the first deposition 32 and the second deposition 34. The third deposition 36 forms an interior surface 40 and an exterior surface 42. The interior surface 40 is located adjacent to a plurality of light sources that direct light 38 into the lens 26.

Figure 3C:
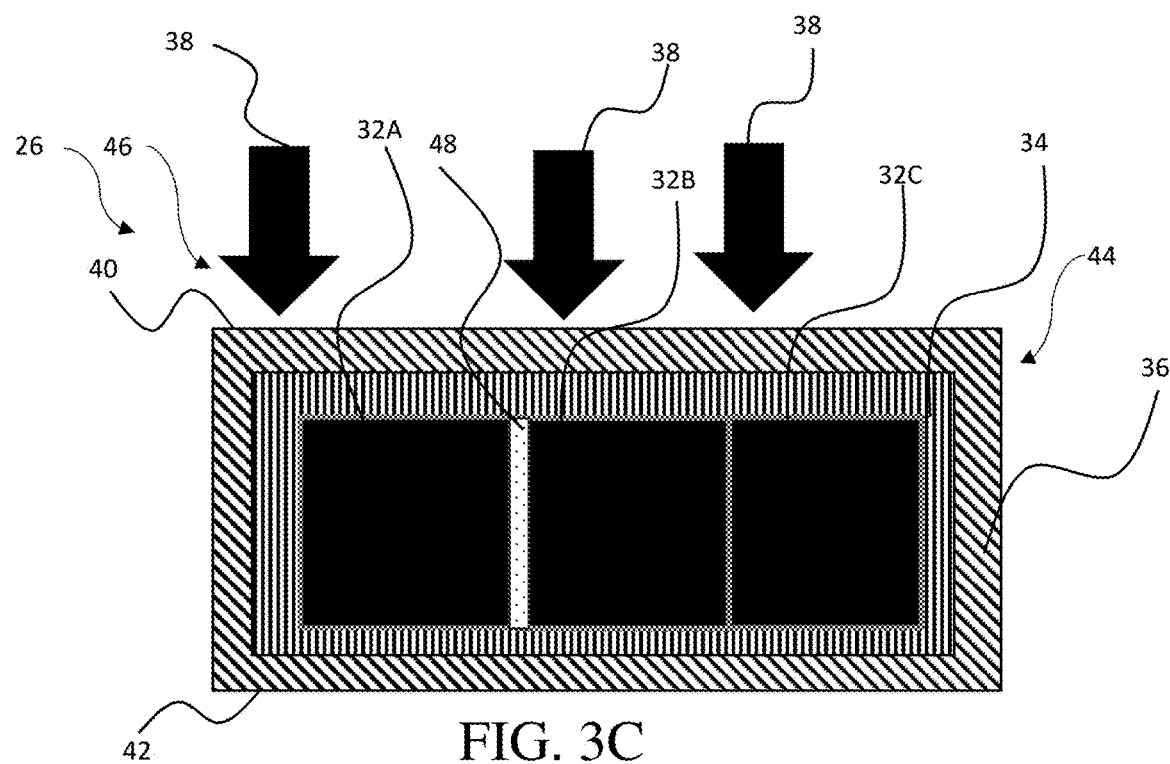
FIG. 3C is a cross-sectional view of a lens including a color deposition as a color material.

FIG. 3C illustrates a partial cross-sectional view of the lens 26. The lens 26 has a first deposition 32 that is divided into a first layer 32A, a second layer 32B, and a third layer 32C. The layers 32A, 32B, and 32C are formed side by side. The second deposition 34 extends around all three layers 32A, 32B, and 32C of the first deposition 32. A third deposition 36 extends around the first deposition 32 and the second deposition 34. The third deposition 36 forms an interior surface 40 and an exterior surface 42. The interior surface 40 is located adjacent to a plurality of light sources that direct light 38 into the lens 26. The first layer 32A and the second layer 32B are spaced apart by a color deposition 48. The color deposition 48 separates a first light type 44 and a second light type 46 so that the first light type is prevented from passing through the first layer 32A and the second light type 46 is prevented from passing through the second layer 32B and the third layer 32C.

Figure 4:
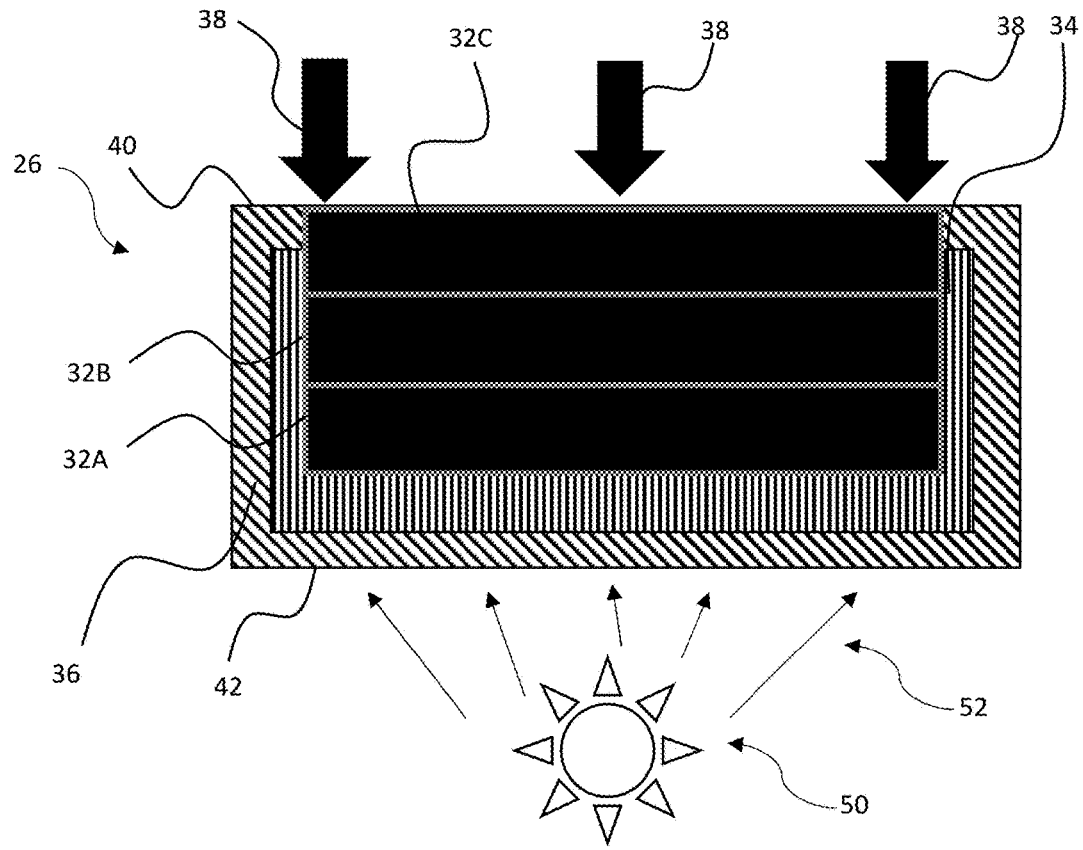
FIG. 4 is a cross-sectional view of a lens.

FIG. 4 illustrates where the first deposition 32 is only partially located within the second deposition 34 and third deposition 36. The first deposition 32 includes a first layer 32A, a second layer 32B, and a third layer 32C stacked one on top of the other to form a thickness. A second deposition 34 extends along the exterior side 42 of the first deposition 32 and extends towards the interior side 40. The third deposition 36 extends along the exterior side 42 and towards the interior side 40. Light 38 is directed, directly into the first deposition 32 then through the second deposition 34 and the third deposition 36. The second deposition 34 and the third deposition 36 cover the first deposition 32 to protect the first deposition 32 from dirt, debris, ultraviolet light 52 from the sun 50, or a combination thereof.

Figure 5A:
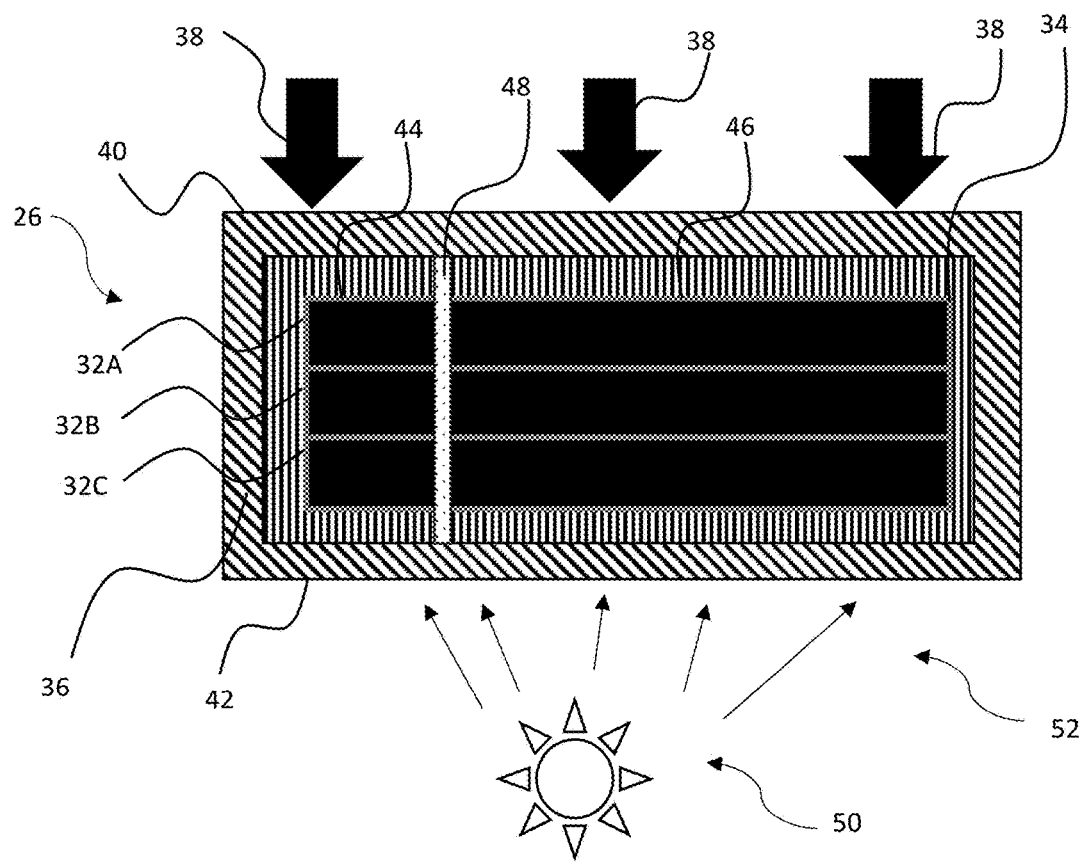
FIG. 5A is a cross-sectional view of a lens including a color deposition as a color material creating two regions.

FIG. 5A is a cross-sectional view of a lens 26 similar to the lens of FIGS. 4 and 3B. The lens 26 includes a color deposition 48 that extends through the first deposition 32 and the second deposition 34. The color deposition 48 may only extend through the first deposition 32. The color deposition 48 may divide the lens 26 into two sections to provide two light functions or two light types. The first deposition 32 is completely surrounded by the second deposition 34 and the third deposition 36 so that the first deposition 32 is protected from the ultraviolet rays 52 of the sun 50.

Figure 5B:
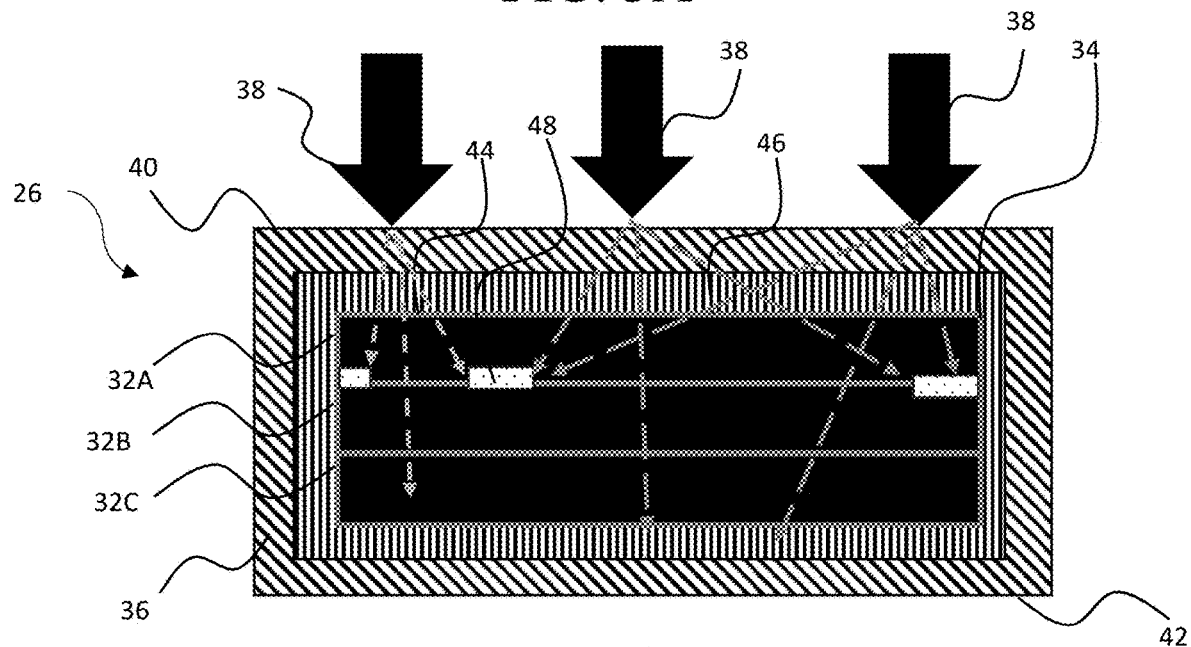
FIG. 5B is a cross-sectional view of a lens including a plurality of color depositions as a color material creating two regions and blocking light from extending out of sides of the lens.

FIG. 5B is a cross-sectional view of a lens 26. The lens 26 has a first deposition 32, a second deposition 34, and a third deposition 36. The first deposition 32 includes a first layer 32A, a second layer 32B, and a third layer 32C. As shown, multiple color depositions 48 are located between the second layer 32B and the third layer 32C. The color depositions 48 allow some of the light 38 to pass through to form a first light type 44 while preventing other light 38 from passing through. The color depositions 48 allow some of the light 38 to pass through forming a second light type 46. The color depositions 48 may be located such that two or more functions are discretely visible. The color depositions 48 may be located between other layers or other depositions. For example, the color depositions 45 may be located between the first layer 32A and the second layer 32B, the first layer 32A and the second deposition 34, the second deposition 34 and a third deposition 36, the third layer 32C and the second deposition 34, or a combination thereof. The color depositions 48 extend perpendicular to the thickness to create different light types or different areas light is extendable through.

Figure 6:
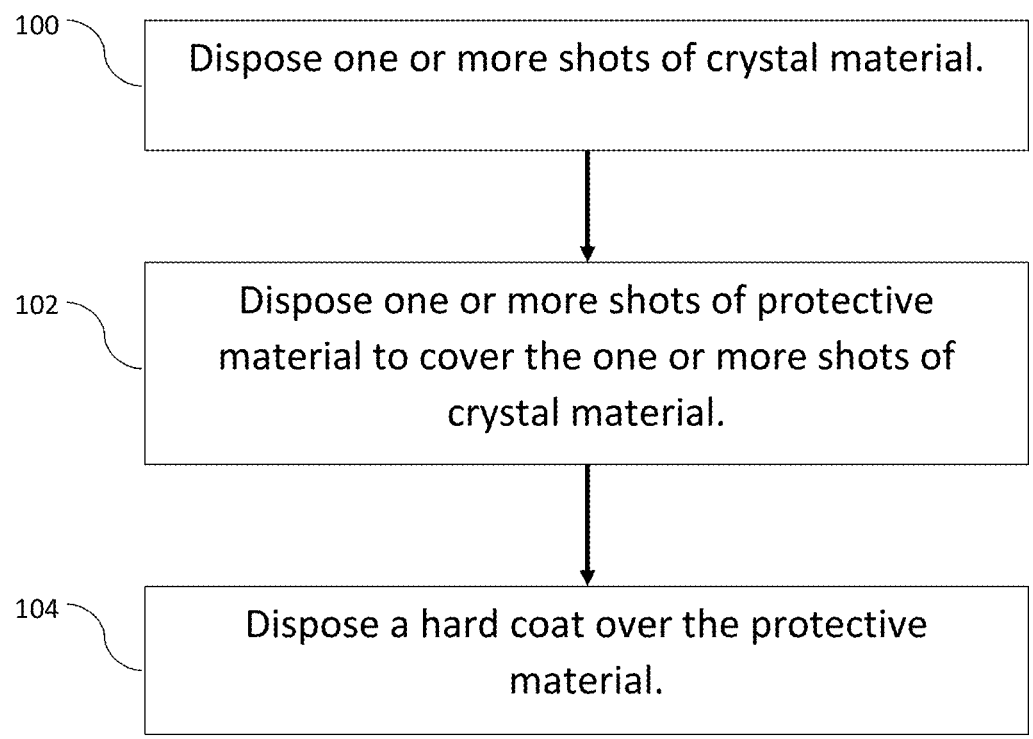
FIG. 6 is a schematic of a process of forming a lens.

FIG. 6 is a schematic view of a process of forming a lens. The process begins by disposing one or more shots of a first material (e.g., a crystal material) into a mold. Once all of the shots of the first material 100 are disposed shots of a second material are disposed into the mold 102. The one or more shots of second material (e.g., a protective material) are disposed over and/or around the first material (e.g., crystal material) 102. A third disposition 104 of material may provide a hard coat over all or a portion of the protective material, the crystal material, or both.

Figure 7:
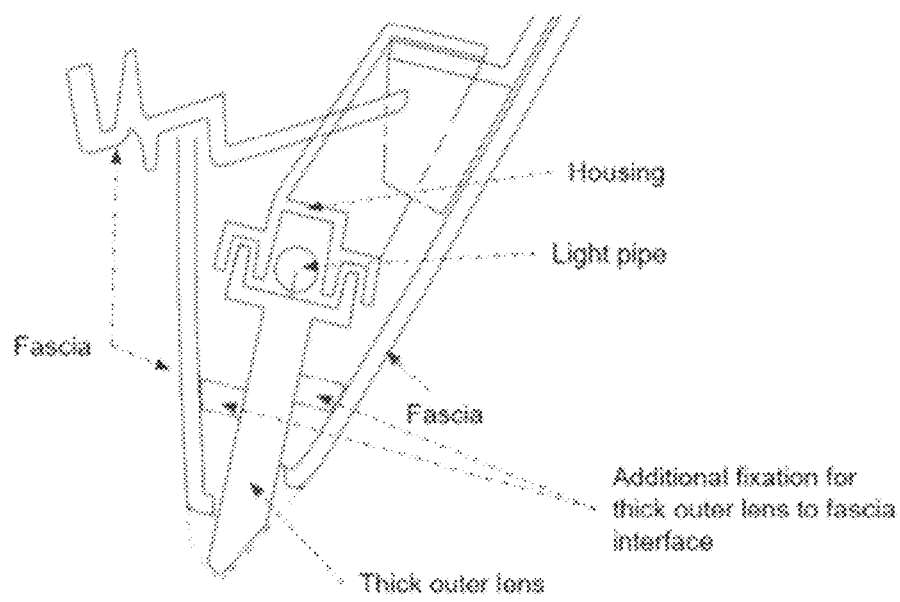
FIG. 7 is a cross-sectional view of a thick blade.

FIG. 7 is a cross-sectional view of a thick outer lens extending outward from fascia of an automotive vehicle. The thick outer lens is in communication with a housing and a light pipe. The think outer lens extend outside of the facia and is exposed to the surrounding environment.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Vehicle
4 Light System
6 Controller
8 Headlight
10 Outer Lens
12 Daytime Running Light
14 Turn Signal
16 High Beam
18 Low Beam
20 Light Source
22 Reflector
24 Daytime Running Light lens
26 Lens
28 Body Portion
30 Waterfall Portion
32 First Deposition
32A-C Layers
34 Second Deposition
36 Third deposition
38 Direction of light
40 Interior
42 Exterior
44 First Light Type
46 Second Light Type
48 Color Deposition
50 Sun
52 Ultraviolet Light
TTT Total Thickness
TFD Total First Deposition
TSD Total Second Deposition
TTD Total third Deposition

We claim:

1. An outer lens comprising:
a first material with a first composition comprising:
a polymer that is substantially free of ultraviolet stabilizers; and
a second material with a second composition that comprises:
a polymer and
the ultraviolet stabilizers, wherein the ultraviolet stabilizers are added in an amount of greater than 0.1 percent by total weight of the outer lens;
wherein the second material surrounds all or a portion of the first material and extends between an external environment of an automotive vehicle and the first material, and wherein the outer lens is directly exposed to the external environment around the automotive vehicle, and
wherein an interior surface of the outer lens receives light from a light pipe that causes the outer lens to glow and project light out of an exterior surface of the outer lens.

2. The outer lens of claim 1, further comprising:
a third material that extends around all or a portion of the outer lens and at least forms an outer most layer of the outer lens between the second material and the external environment,
wherein the third material is a hard coating that protects all or a portion of the outer lens.

3. The outer lens of claim 2, wherein the third material is sprayed on the second material or the third material is applied on the outer lens within a mold.

4. The outer lens of claim 1, further comprising:
a color material that separates all or a portion of the outer lens into two or more discrete zones that are each configured to allow light to pass through to provide two or more lighting functions.

5. The outer lens of claim 4, wherein the color material prevents light from passing between the two or more discrete zones, blocks internal component from being visible through the outer lens, or both.

6. The outer lens of claim 5, wherein the color material is black or opaque.

7. The outer lens of claim 1, wherein the first material is encapsulated within the second material so that the second material protects the first material from ultraviolet light.

8. The outer lens of claim 1, further comprising:
a color material extending though the first material from the interior surface towards the exterior surface so that the first material is divided into separate zones, wherein the color material prevents light from passing through a first zone into a second zone of the first material.

9. The outer lens of claim 1, wherein the first material is only partially located within the second material so that the first material faces the light at the interior surface, and
wherein the exterior surface of the first material is covered by the second material so that the first material is protected from ultraviolet light from the external environment.

10. The outer lens of claim 1, wherein the light extends through the outer lens in a direction parallel to the first material and the second material and out of the outer lens through the exterior surface.

11. An outer lens comprising:
an interior surface that is configured to face an interior of an automotive vehicle;
an exterior surface that faces away from the interior of the automotive vehicle and faces an environment exterior to the automotive vehicle so that the exterior surface and the environment are in direct communication;
a first material located between the interior surface and the exterior surface, the first material comprising:
a first composition including acrylic, polyurethane, polycarbonate, or a combination thereof and the first composition is substantially free of ultraviolet stabilizers;
a second material located between the first material and the exterior surface so that the second material is located between the environment and the first material, the second material comprising;
a second composition including:
polyurethane, polycarbonate, or both and the ultraviolet stabilizers, wherein the ultraviolet stabilizers prevent ultraviolet rays from the environment from contacting the first material and
wherein the outer lens has a thickness of 10 mm or more and the interior surface of the outer lens receives light from a light pipe that causes the outer lens to glow and project the light out of the exterior surface of the outer lens.

12. The outer lens of claim 11, wherein the second material is sufficiently thick so that ultraviolet light is prevented from passing through the second material into contact with the first material.

13. The outer lens of claim 12, further comprising:
a third material that extends between the environment and the first material and the second material,
wherein the first material comprises two or more layers.

14. The outer lens of claim 11, wherein the outer lens has a total thickness extending between the interior surface and the exterior surface and the first material comprises a thickness of between 50 percent and 95 percent of the total thickness and the second material comprises a second thickness of between 15 percent and 40 percent of the total thickness of the outer lens.

15. The outer lens of claim 14, wherein the total thickness is between 12 mm and 25 mm.

16. A method comprising:
forming an outer lens comprising an interior surface and an exterior surface, a step of forming comprising:
disposing two or more layers of a first material into a mold to form the outer lens, the first material comprising:
a polymer that is substantially free of ultraviolet stabilizers; and
disposing one or more layers of a second material into the mold over the first material so that the second material is located between the first material and an external environment so that the second material protects the first material from the external environment, the second material comprising:
a polymer comprising: polyurethane, polycarbonate, or both and ultraviolet stabilizers,
directing light from a light pipe into the interior surface of the outer lens so that the light projects out of the exterior of the outer lens;
wherein the two or more layers of the first material and the one or more layers of the second material have a total thickness of 12 mm or more; and
wherein the outer lens is a directly exposed to an external environment around the automotive vehicle.

17. The method of claim 16, wherein the step of forming the outer lens further comprises:
disposing a third material over all or a portion of the second material, wherein the third material is located between at least the second material and the external environment.

18. The method of claim 17, wherein the step of forming the outer lens further comprises:
disposing the third material between the second material and the external environment, wherein the third material is a hard material that protects the first material and the second material from the external environment.

19. The method of claim 16, wherein the step of forming the outer lens further comprises:
disposing a color material between the two or more layers of the first material, between the first material and the second material, or both.

20. The method of claim 16, wherein the step of forming the outer lens further comprises:
   disposing a color material into the mold though the first material so the first material is divided into two or more zones.

\* \* \* \* \*